(12) United States Patent
Fuchs et al.

(10) Patent No.: US 10,704,629 B2
(45) Date of Patent: Jul. 7, 2020

(54) ELECTRIC WEAR-ADJUSTING DEVICE OF A DISC BRAKE, A CORRESPONDING DISC BRAKE, AND METHOD FOR MEASURING AND SETTING THE AIR PLAY AND FOR MEASURING WEAR

(71) Applicant: KNORR-BREMSE Systeme fuer Nutzfahrzeuge GmbH, Munich (DE)

(72) Inventors: Alexander Fuchs, Munich (DE); Robert Theil, Tuerkenfeld (DE); Csaba Mlinarcsek, Budapest (HU); Janos Toth, Kecskemet (HU); Peter Kovacsik, Budapest (HU); Robert Trimpe, Wessling (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 36 days.

(21) Appl. No.: 15/948,810

(22) Filed: Apr. 9, 2018

(65) Prior Publication Data

US 2018/0223933 A1 Aug. 9, 2018

Related U.S. Application Data

(63) Continuation of application No. PCT/EP2016/074160, filed on Oct. 10, 2016.

(30) Foreign Application Priority Data

Oct. 9, 2015 (DE) .................. 10 2015 117 252

(51) Int. Cl.
*F16D 65/56* (2006.01)
*F16D 55/2255* (2006.01)
(Continued)

(52) U.S. Cl.
CPC ....... *F16D 65/568* (2013.01); *F16D 55/2255* (2013.01); *F16D 65/567* (2013.01);
(Continued)

(58) Field of Classification Search
CPC ...... F16D 65/56; F16D 65/567; F16D 65/568; F16D 65/62; F16D 65/64; F16D 65/66; F16D 55/225; F16D 55/2255
(Continued)

(56) References Cited

U.S. PATENT DOCUMENTS 6,325,180 B1    12/2001  De Vries et al.
7,497,306 B2 *   3/2009  Severinsson .......... F16D 65/183
                                              188/72.2
(Continued)

FOREIGN PATENT DOCUMENTS

DE    41 37 737 C1    4/1993
DE    102 52 301 B4   1/2006
(Continued)

OTHER PUBLICATIONS

German Search Report issued in counterpart German Application No. 10 2015 117 252.6 dated Jul. 29, 2016 with partial English-language translation (Twenty-One (21) pages).
(Continued)

*Primary Examiner* — Thomas J Williams
(74) *Attorney, Agent, or Firm* — Crowell & Moring LLP

(57) ABSTRACT

An electric-wear adjusting device of a motor vehicle disc brake is provided for adjusting friction surface wear on the brake linings and brake disc of the disc brake having. having a brake application device, preferably with a rotary brake lever. The adjusting device includes an electric motor, a gear mechanism, and an output element. The output element is connected rotationally fixed to a clamping sleeve. The clamping sleeve has inwardly projecting longitudinal ribs on
(Continued)

an inner side configured to cooperate with axial grooves of a threaded plunger of a wear-adjuster spindle unit. Also provided is a corresponding disc brake having the electric wear-adjusting device, and a method for measuring and setting air play and measuring wear of a disc brake having the electric wear-adjusting device.

21 Claims, 5 Drawing Sheets

(51) Int. Cl.
   *F16D 65/38* (2006.01)
   *F16D 66/00* (2006.01)
   *F16D 121/02* (2012.01)
(52) U.S. Cl.
   CPC .. *F16D 2065/386* (2013.01); *F16D 2066/001* (2013.01); *F16D 2066/006* (2013.01); *F16D 2121/02* (2013.01)
(58) Field of Classification Search
   USPC ........ 188/1.11 W, 1.11 L, 1.11 E, 71.7, 71.8, 188/71.9, 196 R, 196 P, 196 B, 196 BA, 188/196 D, 196 V
   See application file for complete search history.

(56) References Cited

U.S. PATENT DOCUMENTS

| | | | |
|---|---|---|---|
| 7,641,025 | B2 | 1/2010 | Baumgartner et al. |
| 7,926,626 | B2 | 4/2011 | Iraschko |
| 9,746,043 | B2 | 8/2017 | Asen et al. |
| 2004/0188189 | A1 | 9/2004 | Baumgartner |
| 2005/0252738 | A1* | 11/2005 | Baumgartner .......... F16D 55/22 188/195 |
| 2006/0070830 | A1* | 4/2006 | Fuderer ................. B60T 17/228 188/196 V |
| 2006/0090968 | A1* | 5/2006 | Taylor ................. F16D 55/2255 188/1.11 L |
| 2006/0124406 | A1* | 6/2006 | Baumgartner ........ F16D 65/183 188/71.8 |
| 2007/0158145 | A1* | 7/2007 | Bieker .................. F16D 65/183 188/72.9 |
| 2014/0167472 | A1 | 6/2014 | Haller |
| 2014/0345985 | A1* | 11/2014 | Miller .................... F16D 65/64 188/79.55 |

FOREIGN PATENT DOCUMENTS

| | | |
|---|---|---|
| DE | 10 2004 037 771 A1 | 3/2006 |
| DE | 10 2012 003 506 A1 | 8/2013 |
| DE | 10 2012 108 672 B3 | 2/2014 |
| DE | 10 2012 112 527 B3 | 6/2014 |
| DE | 10 2013 020 750 A1 | 6/2015 |
| WO | WO 99/02883 A1 | 1/1999 |
| WO | WO 02/088562 A1 | 11/2002 |
| WO | WO-2013189979 A1 * | 12/2013 ............. F16D 55/22 |
| WO | WO-2014019894 A1 * | 2/2014 ............. F16D 65/52 |

OTHER PUBLICATIONS

International Search Report (PCT/ISA/210) issued in PCT Application No. PCT/EP2016/074160 dated Feb. 7, 2017 with English-language translation (Six (6) pages).
Japanese-language Written Opinion (PCT/ISA/237) issued in PCT Application No. PCT/EP2016/074160 dated Feb. 7, 2017 (five (5) pages).
Cover page of EP 1 386 092 A1 published Feb. 4, 2004.

* cited by examiner

ELECTRIC WEAR-ADJUSTING DEVICE OF A DISC BRAKE, A CORRESPONDING DISC BRAKE, AND METHOD FOR MEASURING AND SETTING THE AIR PLAY AND FOR MEASURING WEAR

CROSS REFERENCE TO RELATED APPLICATIONS

This application is a continuation of PCT International Application No. PCT/EP2016/074160, filed Oct. 10, 2016, which claims priority under 35 U.S.C. § 119 from German Patent Application No. 10 2015 117 252.6, filed Oct. 9, 2015, the entire disclosures of which are herein expressly incorporated by reference.

BACKGROUND AND SUMMARY OF THE INVENTION

The invention relates to an electric wear-compensating readjustment apparatus of a disk brake, in particular for a motor vehicle. The invention also relates to a corresponding disk brake and to a method for measuring and setting an air gap and measuring wear of a disk brake of said type.

Vehicles, in particular motor vehicles, are equipped with friction brakes for the purposes of converting kinetic energy. Here, in particular in the passenger motor vehicle sector and in the utility vehicle sector, the disk brake is preferred. In the typical structural form of a disk brake, this is composed of a brake caliper together with an internal mechanism, of generally two brake pads, and of the brake disk. Using a pneumatically actuated cylinder, the cylinder forces are introduced into the internal mechanism, are boosted by an eccentric mechanism, and are transmitted as an application force via threaded spindles to brake pads and brake disk, wherein the wear of brake disk and brake pads is compensated by the threaded spindles.

The application forces act via both brake pads on the brake disk. Since the pads are, in terms of construction, designed as wearing parts, they are generally softer than the brake disk, that is to say the pads undergo a change in pad thickness over their service life; they become worn. The brake disk can also become worn. This wear gives rise to the need for compensation for the wear in order to maintain a constant air gap between the brake pads and the brake disk. A constant air gap is required in order to keep the response times of the brake short, to ensure the free movement of the brake disk, and to maintain a stroke reserve for limit load situations.

An example of a wear-compensating readjustment apparatus is described in document DE 10 2004 037 771 A1. Here, a drive rotational movement is transmitted for example from a torque-limiting device, for example with a ball ramp, via a continuously acting clutch (slipping clutch) to an adjustment spindle of a pressure plunger. Here, the air gap is adjusted in continuous fashion.

An example of a readjustment device is described in document DE 10 2012 108 672 B3.

Here, it is considered to be a disadvantage that, in the case of a mechanical readjuster, too small an air gap or too large an air gap cannot be kept in the optimum range, and cannot be adapted in accordance with the situation. Here, in the case of too small an air gap, so-called grinding with a grinding torque can occur, which can result in premature wear of brake pads and brake disk and also increased fuel consumption.

Geometrically, a so-called design air gap is determined by taking into account the manufacturing tolerances of the components and a worst-case combination of the component dimensions, thermal expansion of the components and elastic deformation during operation owing to the temperatures and loads.

DE10252301B4 describes an example for illustrating a disk brake with an electrically driven readjustment apparatus.

It is the object of the present invention to provide an improved readjustment device which avoids or at least considerably avoids the abovementioned disadvantages.

It is a further object to provide an improved disk brake.

It is a yet further object to create an improved method for air gap measurement, air gap setting and wear measurement.

An electric wear-compensating readjustment apparatus is created which has an output element with a clamping sleeve. The clamping sleeve may be used for directly driving a threaded plunger of a disk brake in a simple manner for readjustment for compensation of friction surface wear.

An electric wear-compensating readjustment apparatus according to the invention provides for readjustment for compensation of friction surface wear on brake pads and brake disk of a disk brake of a motor vehicle. The readjustment apparatus includes an electric motor; a gearing; and an output element. The output element is connected rotationally conjointly to a clamping sleeve which has inwardly projecting longitudinal ribs on its inner side. The motor vehicle may in particular be a utility vehicle.

Alternatively, in one embodiment, in the case of a disk brake with two plungers, the gearing output can be placed directly in engagement with the sprocket of the synchronization unit. The sprocket may be understood here to be a synchronizing wheel. Here, the gearing output is connected in positively locking fashion in a circumferential direction to the sprocket. Owing to the positively locking connection, the rotational movement introduced from the readjustment unit can be transmitted to the synchronization unit and the spindle. The connection between the gearing output and sprocket may in this case be designed with radial play in order to compensate for movements of the bridge/cross-member of up to 1° during operation.

In the alternative embodiment, an electric wear-compensating readjustment apparatus according to the invention provides for readjustment for compensation of friction surface wear on brake pads and brake disk of a disk brake. The readjustment apparatus includes an electric motor, a gearing and an output element. The output element is rotationally conjointly connected directly to a synchronizing wheel, wherein the synchronizing wheel is designed for rotationally conjoint engagement with a threaded spindle of the associated disk brake.

A variant of this embodiment is distinguished by the fact that the output element is formed in one piece with the synchronizing wheel, whereby a number of parts is reduced.

A disk brake according to the invention having the wear-compensating readjustment apparatus described above preferably is actuated by compressed air, in particular for a motor vehicle, having an application apparatus, preferably having a brake rotary lever having at least one spindle unit with in each case one threaded plunger, and has at least one electric wear-compensating readjustment apparatus with a control unit.

The result is a space-saving, compact and lightweight wear-compensating readjustment apparatus, which can advantageously be installed on a threaded plunger in a simple manner. The threaded plunger may have longitudinal grooves with which the longitudinal ribs of the synchronizing wheel can be placed in engagement in a simple manner. The synchronizing wheel is furthermore in engagement, by a radial, positively locking connection, with the clamping sleeve, which permits longitudinal displaceability between synchronizing wheel and clamping sleeve. This may be realized for example by virtue of the clamping sleeve being in engagement with the synchronizing wheel by balls in a ball cage, wherein the synchronizing wheel is in engagement with the threaded spindle.

For this purpose, it is provided that the clamping sleeve is formed, on its free end, with an engagement section, which forms a constituent part of a rotationally conjoint coupling of the clamping sleeve to a first synchronizing wheel of a synchronizing unit of the associated disk brake.

A method according to the invention for air gap measurement and air gap setting of the above-described disk brake includes the method steps of: (S20) providing a wear-compensating readjustment apparatus having an electric motor and a gearing; (S21) measuring the present air gap and setting a new air gap of the disk brake; and (S22) communicating with further wear-compensating readjustment apparatuses of an associated vehicle via data interfaces, and monitoring and performing plausibility checks on the measurements and settings.

A further method according to the invention for measuring friction-induced wear of brake pads and of a brake disk of the above-described disk brake includes the method steps of: (S23) defining an initial position of the brake pad and storing the initial position in the control unit; (S24) measuring the air gap; (S26) calculating the friction-induced wear on the basis of the measured values of the air gap with the overall rotational angle $\alpha_{overall}$, the gearing transmission ratio i, the specified air gap LS and spindle pitch p in accordance with the following calculation rule:

$$X_{wear} = x_{initial} - \alpha_{overall} * i * p + LS;$$

(S27) deciding whether a pad change is necessary by comparing the calculated friction-induced wear with a predefined value, wherein, if a pad change is not yet necessary, the method returns to the method step (S25); and (S28) generating an item of information regarding the required pad change, and displaying and/or communicating said item of information.

In one embodiment of the two described methods, the step (S21) of measuring the present air gap and setting a new air gap of the disk brake of the method for air gap measurement and air gap setting and the step (S24) of measuring the air gap of the method for measuring friction-induced wear of brake pads and of a brake disk correspond.

Here, it is particularly advantageous that operational values of the electric motor can be taken into consideration as parameters for the calculation of the air gap and of a contact point.

The air gap can be reduced to a necessary minimum. Grinding torques can be ruled out to a considerable extent. A service life of brake pads and brake disk can be advantageously lengthened.

In one embodiment, a motor shaft of the electric motor, with a drive pinion, and the output element may be arranged coaxially. In this way, only a minimal structural space is taken up.

Furthermore, in another embodiment, it is provided that the gearing may be a two-stage planetary gearing. In this way, a high transmission ratio is realized, whereby, at the same time, a high degree of self-locking against rotation of the threaded plunger of its own accord as a result of vibrations is possible.

In another embodiment, a housing of the gearing may have a fastening section for positionally fixed fastening in a brake caliper of the associated disk brake, and may have a gearing section in which the two-stage planetary gearing is arranged. This yields a compact construction.

Furthermore, in a further embodiment, the fastening section and the gearing section of the gearing may be formed in one piece, wherein the gearing section may be formed with an internal toothing as an internal gear of the two-stage planetary gearing. A high level of functionality is thus possible in a small structural space.

In a yet further embodiment, it is provided that a first gearing stage of the gearing is in engagement with the drive pinion of the electric motor as sun gear, wherein a second planet carrier of the second gearing stage of the gearing may be a constituent part of the output element. A compact design can thus be made possible.

In a yet further embodiment, it is provided that the gearing may be a three-stage gearing. In this way, a very high transmission ratio is realized, whereby the power demands on the electric motor can be reduced. Expressed more generally, the gearing may be a multi-stage gearing. Accordingly, the gearing can be designed correspondingly to the electric motor and to the power demand.

If the electric motor has a high cogging torque, a resistance to undesired adjustment of the threaded plunger owing to vibrations can be increased.

In another embodiment, the electric motor may be an electronically commutated (EC) electric motor. In this way, rotational speed and torque of the electric motor can be adjustable over wide ranges, and adaptable in accordance with the situation, with high quality using commercially available, inexpensive controllers.

In a further embodiment of the disk brake, the wear-compensating readjustment apparatus may be arranged above the threaded plunger, wherein the clamping sleeve is mounted onto the threaded plunger of the at least one spindle unit of the disk brake and at least partially encloses the threaded plunger. In this way, an advantageously compact construction can be made possible.

In one alternative, the disk brake furthermore has a first spindle unit with a first threaded plunger and a second spindle unit with a second threaded plunger. The threaded plungers are screwed into a crossmember, the crossmember interacts with the application apparatus (preferably with the brake rotary lever) and a synchronizing device with synchronizing wheels arranged in the crossmember. The wear-compensating readjustment apparatus may be arranged above the first threaded plunger of the first spindle unit, where the clamping sleeve is mounted onto the first threaded plunger of the first spindle unit and at least partially encloses the first threaded plunger, and a free end of the clamping sleeve is rotationally conjointly coupled to the first synchronizing wheel by a coupling section in a first synchronizing wheel of the synchronizing unit. This yields a compact construction.

In a further embodiment of the disk brake, it is provided that the inwardly projecting ribs of the clamping sleeve of the wear-compensating readjustment apparatus are in engagement with longitudinal grooves of the first threaded plunger. In this way, a rotationally conjoint connection between clamping sleeve and threaded plunger is advantageously made possible, wherein the threaded plunger is guided so as to be displaceable relative to the clamping sleeve.

In one alternative, a disk brake for a motor vehicle, actuated preferably by compressed air, includes an application apparatus (preferably having a brake rotary lever), at least one electric wear-compensating readjustment apparatus with a control unit, a first spindle unit with a first threaded plunger and a second spindle unit with a second threaded plunger. The threaded plungers are screwed into a crossmember which interacts with the application apparatus and a synchronizing device with synchronizing wheels arranged in the crossmember. The wear-compensating readjustment apparatus, which is described above as an alternative, is arranged above the first threaded plunger of the first spindle unit, where the output element at least partially encloses the first threaded plunger, and a coupling section of the output element is rotationally conjointly connected to a first synchronizing wheel of the synchronizing unit or is formed in one piece with said first synchronizing wheel.

In the method for air gap measurement and air gap setting, it is provided that the method step (S21) has the following sub-steps: (S210) applying the brake pad by activation of the electric motor in a first direction of rotation using the control unit; (S211) applying the brake pad until the brake pad makes contact with the brake disk at a contact point; (S212) detecting said contact point or said contact by detecting an increase in current of the electric motor, by a force sensor, by a spacing sensor and/or by a temperature sensor for detecting a change in temperature on the surface of the brake disk and/or of the brake pad; (S213) stopping the rotational movement of the electric motor after detection of the contact point, and calculating the air gap using system parameters (rotational steps, rotational angle, rotational angle position, axial position, gearing transmission ratio); (S214) activating the electric motor in a second direction of rotation which is opposite to the first direction of rotation, and adjusting the brake pad away from the brake disk into a position that corresponds to the calculated air gap; (S215) storing the deviation or the rotation performed, both clockwise and counterclockwise (readjustment), in order to calculate the overall rotational angle for the purposes of sensing wear.

In one embodiment of the method for wear measurement, it is provided that, in the method step (S24) of measuring the air gap, the method step of measuring the air gap is performed in accordance with the above-described method for air gap measurement and air gap setting with a defined frequency.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
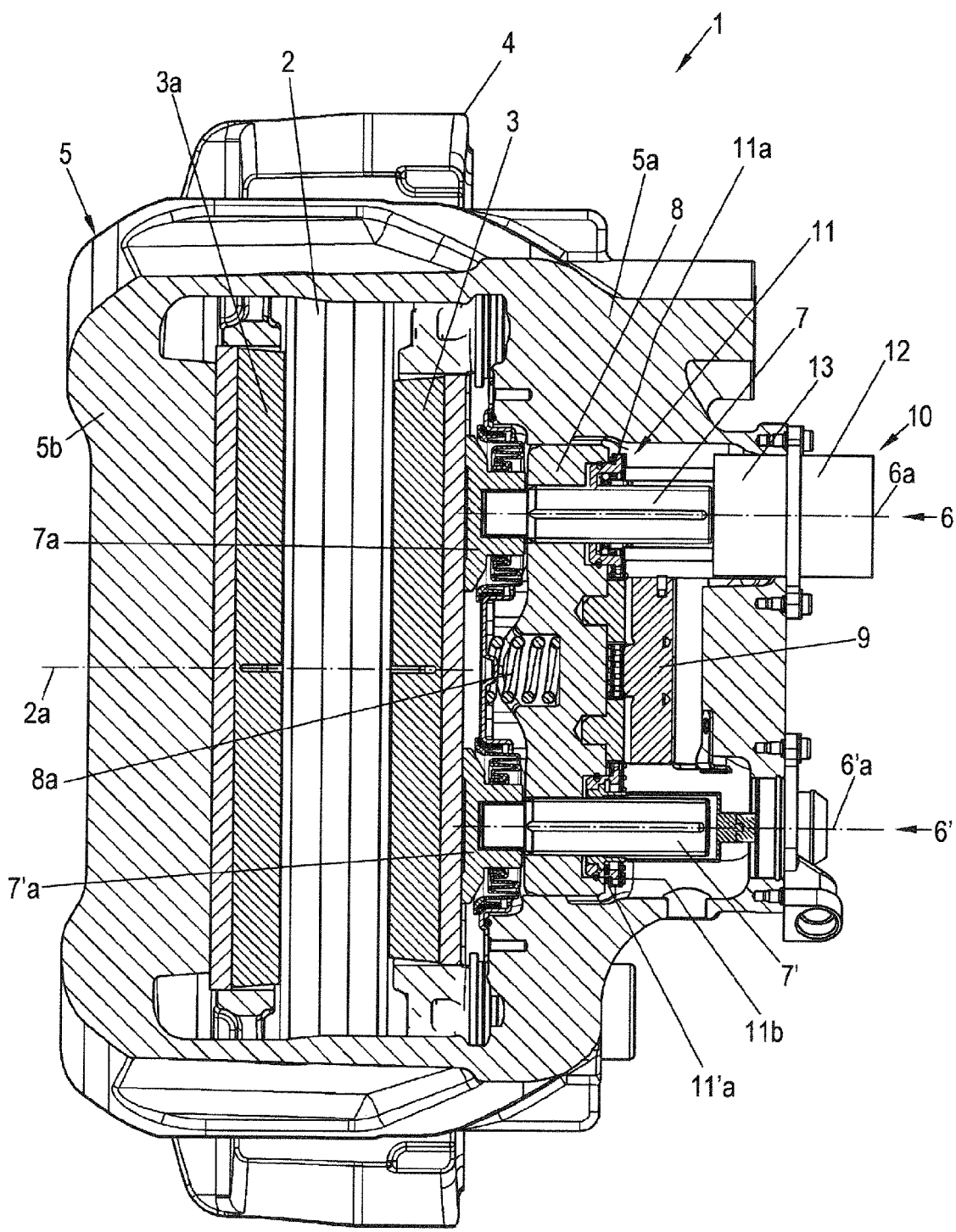
FIG. 1 shows a schematic sectional view of an embodiment of a disk brake according to the invention with an embodiment of a wear-compensating readjustment apparatus according to the invention.

FIG. 1 illustrates a schematic sectional view of an embodiment of a disk brake 1 according to the invention with an embodiment of a wear-compensating readjustment apparatus 10 according to the invention.

The disk brake 1 has a brake disk 2 with a brake disk axis 2a. On both sides of the brake disk 2, there is arranged in each case one brake pad 3, 3a. The brake pads 3, 3a are received in pad slots of a brake carrier 4. The brake disk 2 is engaged over by a brake caliper 5, which in this case is designed as a floating caliper. The brake caliper 5 has an application section 5a and a rear section 5b, and is attached to the brake carrier 4, so as to be displaceable in the direction of the brake disk axis 2a, on a bearing arrangement (fixed bearing, floating bearing) that is not designated in any more detail.

The brake pad 3 situated adjacent to the application section 5a of the brake caliper 5 is referred to as application-side brake pad 3, and the brake pad 3a arranged on the rear section 5b of the brake caliper 5 is referred to as rear-side or reaction-side brake pad 3a.

In this embodiment, the disk brake 1 is formed as a two-plunger brake with a first spindle unit 6 and a second spindle unit 6' with in each case one spindle axis 6a, 6'a. The spindle axes 6a, 6'a run parallel to one another and parallel to the brake disk axis 2a. The first spindle unit 6 has a first threaded plunger 7 and the second spindle unit 6' has a second threaded plunger 7'. The threaded plungers 6, 6' are in this case formed as a solid shaft with external thread.

The application-side brake pad 3 is connected to the spindle units 6, 6' via thrust pieces 7a, 7'a which are arranged on ends of the threaded plungers 7, 7'. The other, reaction-side brake pad 3a is fixed, on the other side of the brake disk 2, in the rear section 5a of the brake caliper 5. The threaded plungers 7, 7' are each, by their external threads, arranged rotatably internal threads of a crossmember 8, which is also referred to as bridge.

The threaded plungers 7, 7' each have a pad-side shaft end and an application-side shaft end. In each case one pad-side shaft end is connected in each case to one thrust piece 7a, 7'a. Furthermore, the threaded plungers 7, 7' are each equipped with a number of axial grooves (not designated here; clearly visible in FIG. 2) which, in this embodiment, extend in each case from the application-side shaft end to the respective pad-side shaft end on the respective circumference of the threaded plunger 7, 7', in the longitudinal direction thereof.

Almost the entire length of the threaded plunger 7, 7', aside from the pad-side shaft ends, is equipped with the external thread.

The crossmember 8 and thus the threaded plungers 7, 7' are actuatable by an application apparatus, in this case a brake rotary lever 9. The brake rotary lever 9 is in this case pivotable about an axis (not shown) running at right angles to the brake disk axis 2a, and has a lever body which interacts with the crossmember 8.

The crossmember 8 is adjustable in the direction of the brake disk axis 2a by the brake rotary lever 9. A movement toward the brake disk 2 is referred to as application movement, and a movement in the opposite direction is referred to as release movement. A restoring spring 8a is received, in the center of the crossmember 8, in a corresponding recess on the pad-facing side of the crossmember 8 and is supported on the brake caliper 3. During release movement, the restoring spring 7 adjusts the cross member 8 into the released position of the disk brake 1 as shown in FIG. 1.

A spacing between the brake pads 3, 3a and the brake disk 2 in the released position is referred to as air gap. Said air gap becomes larger owing to pad and disk wear. If this is not compensated, the disk brake 1 cannot achieve its peak performance, because an increased actuating stroke of the actuating mechanism (in this case the actuating stroke or a pivot angle of the brake rotary lever 9).

The disk brake 1 may have different power drives. The rotary lever 9 is in this case pneumatically actuated, for example. With regard to the construction and function of a pneumatic disk brake 1, reference is made to the corresponding description of DE 197 29 024 C1, in particular to DE 10 2012 108 672 B3.

The wear-compensating readjustment apparatus 10 according to the invention is designed for the wear-compensating readjustment of a previously set air gap, which is referred to as nominal air gap. The expression "readjustment" is to be understood to mean both an air gap reduction and an air gap enlargement. The previously set air gap can normally be selected freely, and is stored in a memory of a control unit (not shown, but easily conceivable). In other words, the wear-compensating readjustment apparatus 10 reduces a present air gap if the latter is too large in relation to the previously set air gap, and increases a present air gap if the latter is too small in relation to the previously set air gap. Too small an air gap can have the effect that the brake pads 3, 3a partially or entirely come into slight contact with the brake disk 2, giving rise to a so-called grinding torque. As a result, increased wear of brake disk 2 and brake pads 3, 3a can give rise to an additional environmental burden, in particular owing to fine dust, and also increased fuel consumption of the vehicle having said brake, because the grinding torque also generates a certain braking action.

The wear-compensating readjustment apparatus 10 comprises in this case an electric motor 12 and a gearing 13. The wear-compensating readjustment apparatus 10 is arranged on the first spindle unit 6, coaxially with respect to the latter, with respect to the first threaded plunger 7 and with respect to the first spindle axis 6a, and is connected rotationally conjointly to said first threaded plunger 7. For readjustment, the wear-compensating readjustment apparatus 10 rotates the first threaded plunger 7 about the first spindle axis 6a.

Since, in the embodiment shown here, the disk brake 1 is a two-plunger disk brake 1, rotational coupling of the first threaded plunger 7 of the first spindle unit 6 to the second threaded plunger 7' of the second spindle unit 6' is provided. This is realized by a so-called synchronizing unit 11, which in this case has two synchronizing wheels 11a, 11'a and a synchronizing device 11b, in this case a chain.

In the event of a readjustment of the wear-compensating readjustment apparatus 10, the axial position of the threaded plungers 7, 7' relative to the crossmember 8 changes by rotating the threaded plungers 7, 7' in the crossmember 8. The expression "axial position" refers here to a position of the threaded plungers 7, 7' in the axial direction of the brake disk axis 2a and of the spindle axes 6a, 6'a.

The functional groups of the wear-compensating readjustment apparatus 10, which will be discussed in detail further below, are, in the direction of the first spindle axis 6a, arranged partly over the first threaded plunger 7. Here, another part of the wear-compensating readjustment apparatus 10 overlaps the application-side shaft end of the associated first threaded plunger 7 and extends, toward the pad-side shaft end of the first threaded plunger 7, over approximately half of the entire length of the axial grooves of the first threaded plunger 7, and in said region is arranged around the first threaded plunger 7. In other words, the wear-compensating readjustment apparatus 10 is arranged concentrically with respect to the first threaded plunger 7 and surrounds the latter at least partially.

The first threaded plunger 7 of the first spindle unit 6 and the second threaded plunger 7' of the second spindle unit 6' are coupled by a synchronizing unit 11 (not described in any more detail here), which is discussed in detail in DE 10 2012 108 672 B3, and to which reference is made here. The synchronizing unit 11 makes it possible for a rotational movement of the first threaded plunger 7 about the first spindle axis 6a to effect a corresponding rotational movement of the second threaded plunger 6' about the second spindle axis 6'a, and vice versa.

Here, the synchronizing unit 11 is arranged on a crossmember top side of the crossmember 8, between the crossmember 8 and the brake rotary lever 9, and includes the first synchronizing wheel 11a, which is coupled to the first threaded plunger 7 and thus also to the wear-compensating readjustment apparatus 10, the second synchronizing wheel 11'a, which is coupled to the second threaded plunger 7', and the synchronizing device 11b, to which the synchronizing wheels 11a and 11'a are coupled. The synchronizing device 11b is in this case a chain. The synchronizing wheels 11a, 11'a are thus formed as sprockets. A synchronous movement of the threaded plungers 7, 7' of the spindle units 6 and 6' during wear-compensating readjustment processes (drive by the wear-compensating readjustment apparatus 10) and setting processes during maintenance work, for example pad changes, is thus ensured.

Each synchronizing wheel 11a, 11'a is rotatably received in positionally fixed fashion in a receptacle (not designated in any more detail), corresponding to the respectively associated synchronizing wheel 11a, 11'a, in the crossmember 8. Said receptacles in this case point with their openings toward the application side of the disk brake 1, that is to say they are formed into the crossmember 8 proceeding from the crossmember top side.

With regard to the construction, arrangement and function of the synchronizing wheels 11a, 11'a, reference is made to the description of DE 10 2012 108 672 B3.

Here, it will be described merely briefly that the first synchronizing wheel 11a, which is assigned to the first spindle unit 6 with the first threaded plunger 7 and to the wear-compensating readjustment apparatus 10, has a hollow cylindrical body which, on its inner wall, is formed with an inner profile extending axially in the direction of the first spindle axis 6a. Said inner profile engages with a clamping sleeve 16 (see FIG. 2) which is connected rotationally conjointly both to the first threaded plunger 7 and to the wear-compensating readjustment apparatus 10. This will be discussed in more detail further below.

Figure 2:
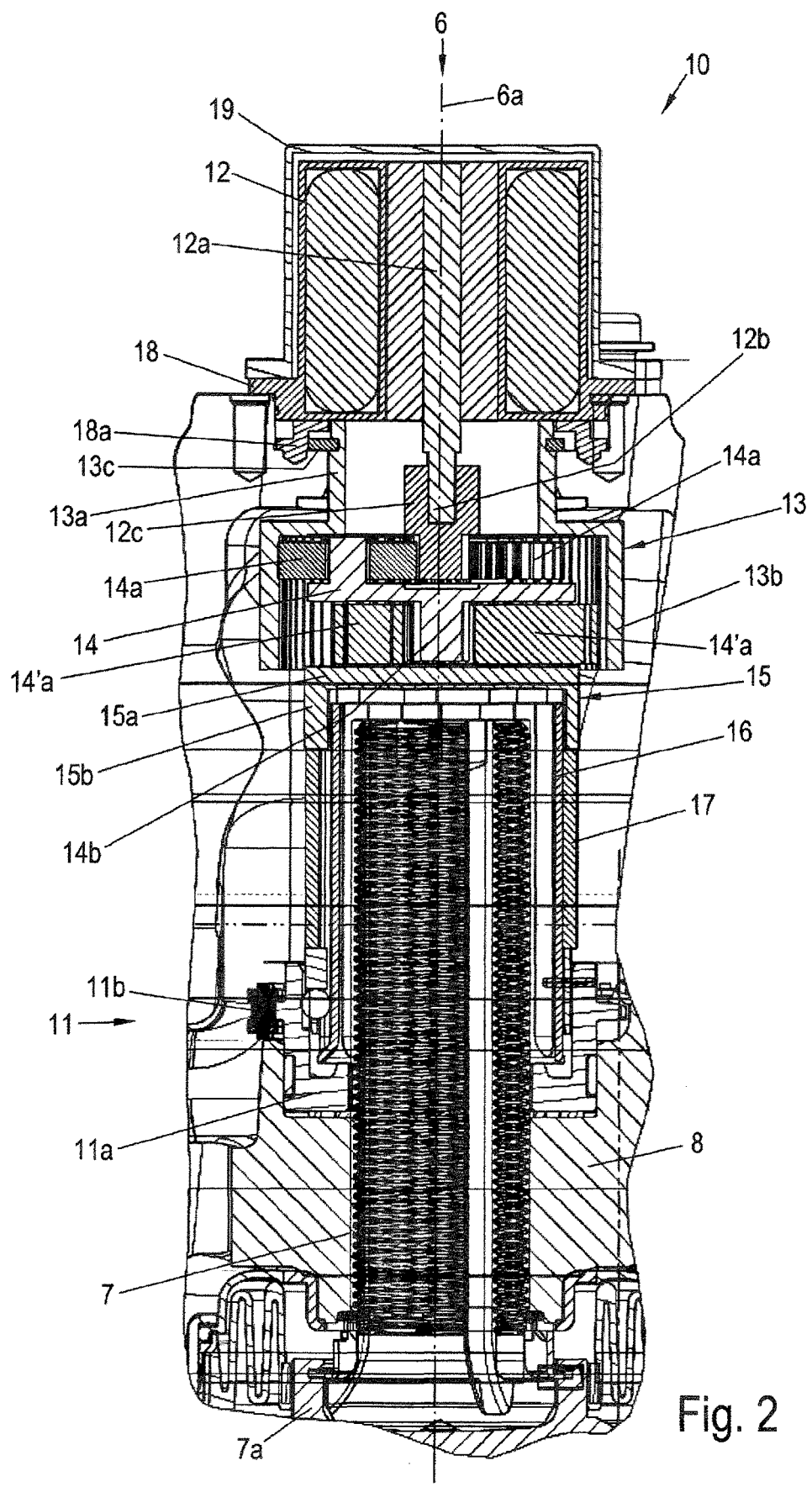
FIG. 2 shows a schematic sectional view of an embodiment of the wear-compensating readjustment apparatus according to the invention as per FIG. 1.
Figure 3:
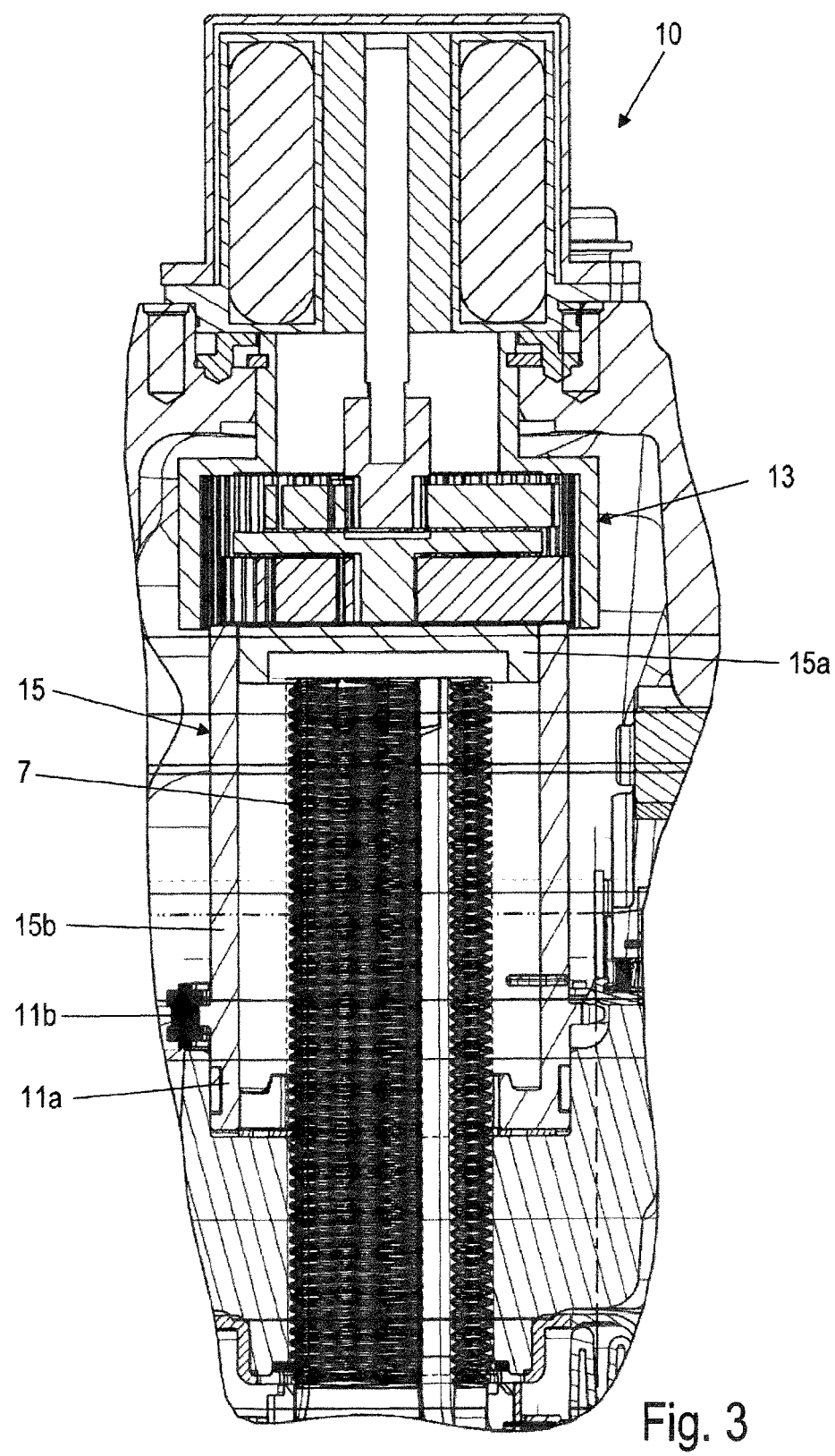
FIG. 3 shows a schematic sectional view of a further embodiment of the wear-compensating readjustment apparatus according to the invention as per FIG. 1.

FIG. 2 shows a schematic sectional view of an embodiment of the wear-compensating readjustment apparatus 10 according to the invention as per FIG. 1. FIG. 3 illustrates a schematic sectional view of a further embodiment of the wear-compensating readjustment apparatus 10 according to the invention as per FIG. 1.

The expression "top" or "top side" is to be understood to mean that side of the respective component which, in the installed state in the disk brake 1, points toward the application side, that is to say is averted from the brake disk 2.

The "underside" of the respective component, or "bottom", then points toward the brake disk 2.

The wear-compensating readjustment apparatus 10 comprises the electric motor 12 and the gearing 13.

The electric motor 12 has a motor shaft 12a, a drive pinion 12c and a motor housing 18. The electric motor 12 is fitted with its motor housing 18 in a receptacle of the application section 5a of the brake caliper 5, above the first threaded plunger 7 of the first spindle unit 6, wherein the electric motor 12 is partially inserted into the receptacle, and its motor shaft 12a extends into the receptacle.

The motor housing 18, which projects from the application section 5a of the brake caliper 5, of the electric motor 12 is covered, and protected against external influences, by a cover 19. The cover 19 and the motor housing 18 are fastened to the application section 5a of the brake caliper 5 by fasteners, for example screws. Radial and axial securing of the electric motor 12 is effected in this way.

The receptacle for the motor housing 18 in the brake caliper 5 is preferably a bore, the center line of which runs coaxially with respect to the spindle axis 6a. In this way, the electric motor 12 can be arranged in centered fashion in the application section 5a of the brake caliper 5 in such a way that the motor shaft 12a is arranged with its axis of rotation, which runs in the longitudinal direction of the motor shaft 12a, coaxial with respect to the spindle axis 6a.

In one embodiment, the readjustment apparatus is sealed off by a sealing element, for example an O-ring, between motor housing 18 and brake caliper 5. The sealing element is not illustrated in the schematic drawing.

The gearing 13 is also received, by way of a fastening section 13a, in the receptacle. Axial fixing of the gearing 13 is realized by a securing ring 13c which interacts with the receptacle and thus with the brake caliper 5 and with a fastening section 13a of the gearing 13. The fastening section 13a is furthermore fixed against rotation relative to the brake caliper 5 by a radial fixing 18a.

At the underside of the electric motor 12, the motor shaft 12a projects with a drive end 12b downward, that is to say in the direction of the brake disk 2. The drive pinion 12c is rotationally conjointly attached to the drive end 12b of the motor shaft 12a. That section of the motor shaft 12a which projects downwardly from the underside of the electric motor 12, the drive end 12b and the drive pinion 12c are arranged in an interior space which is surrounded and defined by the fastening section 13a of the gearing 13.

The electric motor 12 is for example a stepper motor. The electric motor may self-evidently also be of some other design, such as for example an electronically commutated motor (EC motor). The electric motor 12 has a high cogging torque in order to prevent inadvertent adjustments of the wear-compensating readjustment apparatus 10 as a result of mechanical vibration influences.

The gearing 13 has a housing with two sections arranged one above the other. The first, upper section is the fastening section 13a, which in this case is of circular cylindrical form and whose outer diameter corresponds to an inner diameter of the receptacle in the application section 5a of the brake caliper 5. To the underside of the fastening section 13a there is attached a circular cylindrical gearing section 13b, the outer diameter of which is approximately 1.5 times the outer diameter of the fastening section 13a. Said circular cylindrical gearing section 13b is formed as a constituent part of the gearing 13 and with an internal toothing.

Figure 4:
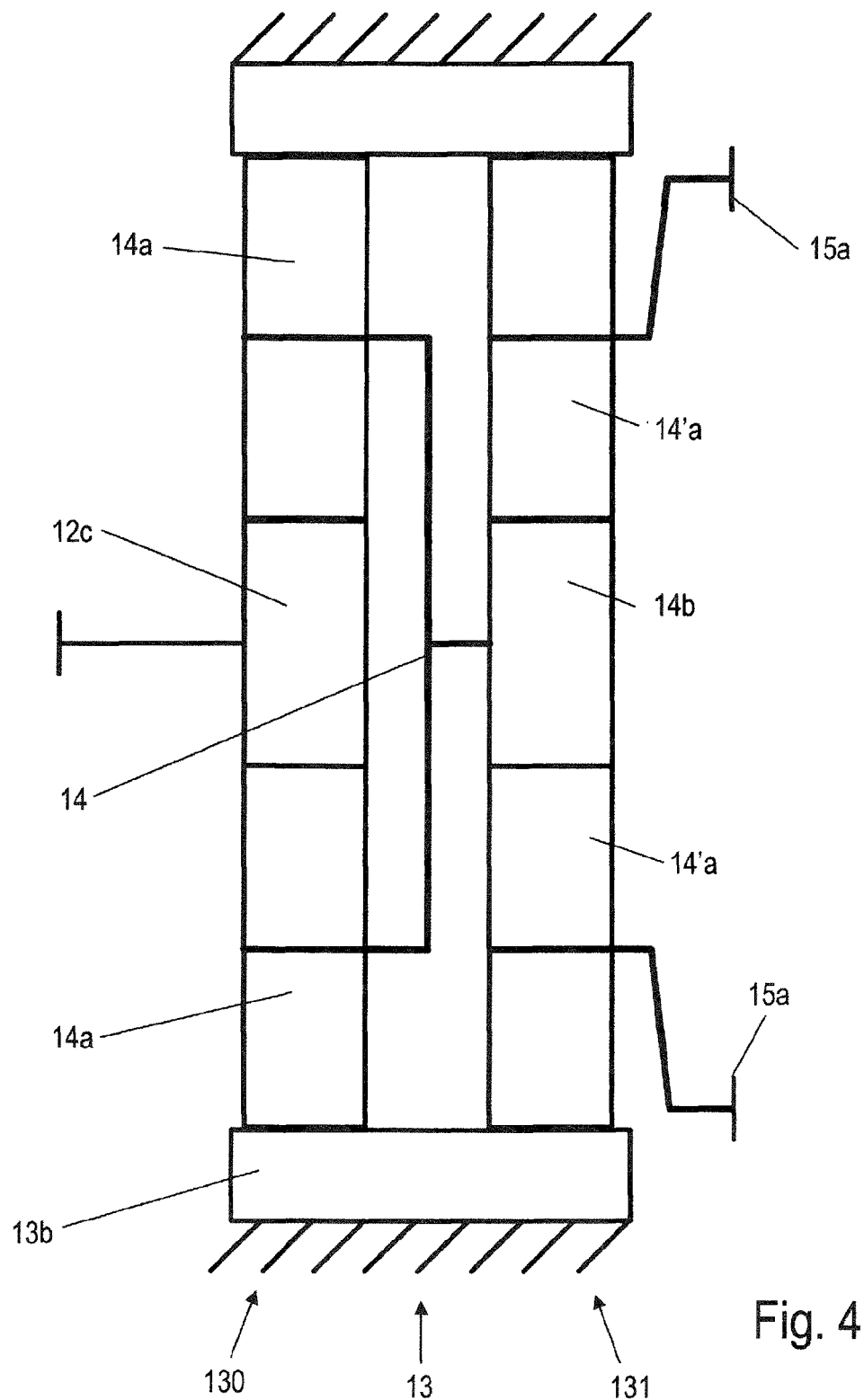
FIG. 4 shows a schematic illustration of the two-stage planetary gearing.

The gearing 13 is in this case preferably a planetary gearing, in particular a multi-stage planetary gearing. In this regard, FIG. 4 shows a schematic illustration of a two-stage planetary gearing.

The gearing 13 furthermore comprises a first planet gear carrier 14 with first planet gears 14a, an output element 15 with a second planet carrier 15a, and second planet gears 14'a and an internal gear. The first planet gears 14a are arranged on the top side of the first planet gear carrier 14 and are in engagement with the drive pinion 12c of the electric motor 12. The drive pinion 12c in this case forms the sun gear of a first gearing stage 130 of the planetary gearing. The first gearing stage 130 of the planetary gearing is thereby formed. The internal toothing of the gearing section 13b forms the internal gear of said first gearing stage 130 and also of a second gearing stage 131 of the planetary gearing.

Since the housing of the gearing 13 is arranged with the fastening section 13a in positionally fixed fashion in the application section 5a of the brake caliper 5, wherein the gearing section 13b is fixedly connected to the fastening section 13a, the gearing section 13b with the internal gear is also arranged in positionally fixed fashion.

The planet gear carrier 14 is equipped, on its side pointing toward the brake disk 2, with a downwardly pointing second sun gear 14b of the second planetary gearing stage 131. The second planetary gearing stage 131 is arranged below the first planetary gearing stage within the gearing section 13b and has second planet gears 14'a, which are arranged on a top side of the second planet carrier 15a and which are in engagement with the sun gear 14b of the second planetary gearing stage 131. The sun gear 14b and second planet gears 14'a of the second planetary gearing stage 131 can be seen from FIG. 4.

On the underside of the second planet carrier 15a, on the circumference, there is arranged an encircling wall which forms a connecting section 15b of the output element 15. An upper section of a clamping sleeve 16 is arranged on, and rotationally conjointly connected to, the inner side of the encircling wall of the connecting section 15b.

The wall of the connecting section 15b extends downward in the direction of the spindle axis 6a over a length which corresponds approximately to half of the length of the gearing section 13b in the direction of the spindle axis 6a, and here, said wall is arranged over the application-side end of the threaded plunger 7. An outer diameter of the output element 15 corresponds approximately to 1.5 times the outer diameter of the threaded plunger 6.

In the initial position of the threaded plunger 7 shown in FIG. 2, the clamping sleeve 16 surrounds the threaded plunger 7 over a length which corresponds approximately to half of the length of the threaded plunger 7. The expression "initial position" refers to the situation in which the brake pads 3, 3a are new, and no wear-compensating readjustment has yet taken place.

The clamping sleeve 16 is designed such that, on its inner side, it has inwardly projecting longitudinal ribs which run in the direction of the spindle axis 6a and which are in engagement with in each case one longitudinal groove of the threaded plunger 7. In this way, the threaded plunger 7 is connected rotationally conjointly to the wear-compensating readjustment apparatus 10. The engagement of the longitudinal ribs of the clamping sleeve 16 with the longitudinal grooves of the threaded plunger 7 furthermore permits an axial movement of the threaded plunger 7 relative to the axially positionally fixed wear-compensating readjustment apparatus 10 during adjustment movements which result in an axial adjustment of the threaded plunger 7 as described above.

Furthermore, in the embodiment illustrated, the clamping sleeve 16 is formed, on its free, lower end, with an engagement section which permits rotationally conjoint coupling— in this case by means of a ball—to the first synchronizing wheel 11a of the synchronizing unit 11. Here, the lower end of the clamping sleeve 16 is inserted into the first synchronizing wheel 11a.

That region of the clamping sleeve 16 which is situated between the underside of the output element 15 and the first synchronizing wheel 11a is in this case covered by a sleeve 17, for example a plastics sleeve.

During the installation of the wear-compensating readjustment apparatus 10, it is firstly the case that the gearing 13 is inserted with the fastening section 13a into the receptacle proceeding from the inner side of the application section 5a, and is fixed axially by the securing ring 13c and radially by the radial fixing 18a. Then, the electric motor 12 is mounted from the outside, wherein the drive pinion 12c of said electric motor is placed in engagement with the first planet gears 14a of the first gearing stage of the gearing 13 in the gearing section 13b.

The threaded plungers 7, 7' are, for example preassembled with the crossmember 8, inserted into the application section 5a proceeding from the brake disk side after the installation of the brake rotary lever 9, wherein the first threaded plunger 7 is inserted into the clamping sleeve 16 of the wear-compensating readjustment apparatus 10. It is also possible for the gearing 13 to already have been mounted with the clamping sleeve 16 on the first threaded plunger 7 before being installed into the application section 5a of the brake caliper 5, and to be fixed in the receptacle in the manner described above after the installation of the crossmember 8 and of the threaded plungers 7, 7'.

In the further embodiment that is shown in FIG. 3, the gearing output of the wear-compensating readjustment apparatus 10 is in direct engagement with the synchronizing wheel 11a, or is in direct engagement with the sprocket of the synchronizing unit 11. In this further embodiment, the coupling section 15b is connected in positively locking fashion in a circumferential direction to the synchronizing wheel 11a, or is formed in one piece with the latter. In the latter case, the coupling section 15b may also be formed in one piece together with the sprocket. It is also conceivable for the sprocket to be attached to the coupling section 15b. Thus, the rotational movement introduced by the wear-compensating readjustment apparatus 10 is transmitted to the synchronizing wheel 11a and from the latter to the threaded plunger 7 and, via the synchronizing unit 11, to the other synchronizing wheel 11'a, and via the latter to the other threaded plunger 7'.

The wear-compensating readjustment apparatus 10 is, with its electric motor 12 as drive, connected to a control unit which is not illustrated but easily conceivable. Also connected to the control unit are various sensors which provide data regarding various states and variables of the disk brake 1 to the control unit. Said control unit may be formed separately, or may be a constituent part of a brake control unit or of a motor controller.

Such sensors can provide data regarding the current and/or the step width/rotational angle of the electric motor 12, forces in/on the disk brake, positions and/or travel of the brake rotary lever 9 and/or of the crossmember 8 and/or of the brake caliper 5 and/or of the thrust pieces 7a, 7'a, temperatures at different points of the disk brake 1 and the like. In this regard, it is also possible for further data from the conventional brake control unit and from the engine control unit of the vehicle to be evaluated. It is likewise possible for the step width/rotational angle to be sensed without additional sensors. Here, motor-internal parameters are evaluated for the rotational angle determination. This may be realized for example by the back EMF (electromotive force) of the electric motor 12. In this way, a detection of a readjustment value or of a degree of wear can be performed.

Accordingly, in one embodiment, the electric motor 12 is connected to a control unit, which receives motor parameters such as current and/or voltage, or signals representing these, and determines a sensor signal therefrom. In such an embodiment, the unit is composed of control unit (not illustrated) and electric motor 12 forms a sensor, or provides a signal which is comparable to a sensor signal or which represents the same information as that provided by a sensor.

In the case of an existing wear sensor, the values determined by the electric motor 12 can be taken into consideration for checking the plausibility of the measurement values of the wear sensor.

Figure 5:
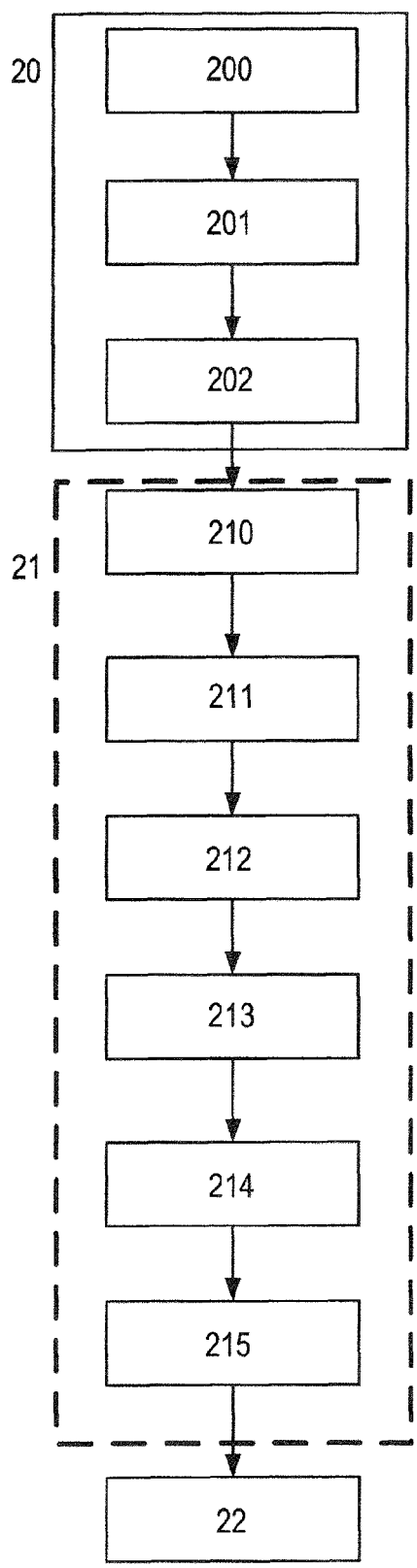
FIGS. 5-6 show schematic flow diagrams of a method according to the invention.
Figure 6:
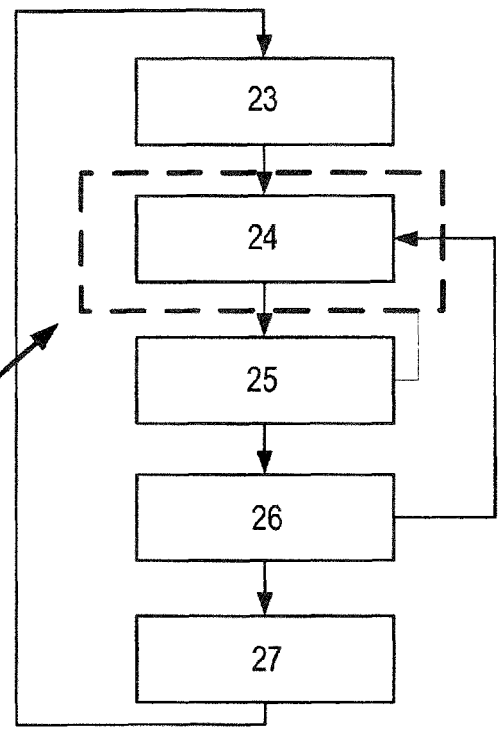

In this regard, FIGS. 5 and 6 shows schematic flow diagrams of methods according to the invention that can be performed using the wear-compensating readjustment apparatus according to the invention of the disk brake 1 according to the invention. FIG. 5 shows a schematic flow diagram of a method for air gap measurement and air gap setting. FIG. 6 shows a schematic flow diagram of a method for wear measurement.

In a first method step 20 of the method for air gap measurement and air gap setting as per FIG. 5, a wear-compensating readjustment apparatus 10 is provided. Here, in a first sub-step 200, the electric motor 12 in the form of a stepper motor, EC motor or the like, with electrical input variables of current I in A and voltage U in V, and mechanical output variables of rotational speed n in degrees per second and output torque M in Nm, is used.

In a second sub-step 201, the gearing 13, with the input variables of input torque $M_{in}$ in Nm and input rotational speed $n_{in}$ in revolutions per second and output variables of output torque $M_{out}$ in Nm and output rotational speed $n_{out}$ in revolutions per second, is used.

In a third sub-step 202, a defined initial air gap is stored by storing the resultant rotational angle in the control unit.

A second method step 21 serves for the measurement of the present air gap and for setting a new air gap of the disk brake 1.

For this purpose, in a first sub-step 210, the electric motor 12 is activated in a first direction of rotation by the control unit in order, via the gearing 13, to impart a rotational movement via the clamping sleeve 16 to the first threaded spindle 7 such that the latter effects an application movement of the brake pad 3, 3a, that is to say moves said brake pad in the direction of the brake disk 2.

In a second sub-step 211, the rotational movement of the electric motor 12 is continued until the brake pad 3, 3a makes contact with the brake disk 2.

Detection of said contact point or of said contact is performed, in a third sub-step 212, using various data. This may be performed by detecting a current increase of the electric motor, by a force sensor, by a distance sensor and/or by a temperature sensor for detecting a temperature change on the surface of the brake disk and/or of the brake pad 3, 3a. The contact point may likewise be implemented through the evaluation of motor-internal parameters.

After detection of the contact point, the rotational movement of the electric motor 12 is stopped, in a fourth sub-step 213, and the air gap is calculated using system parameters (rotational steps, rotational angle, rotational angle position, axial position, gearing transmission ratio).

In a fifth sub-step 214, the electric motor 12 is activated in a second direction of rotation opposite to the first direction of rotation, in order to move the brake pad 3, 3a back from the brake disk 2, wherein said brake pad assumes a position which corresponds to the air gap defined on the basis of the set parameters.

Finally, in a sixth sub-step 215, the deviation or the rotation performed, clockwise and counterclockwise, in the case of a readjustment being performed, is stored in the control unit in order to update the overall rotational angle. The deviation, or rotation performed, stored in the sixth sub-step 215 is used for the determination of the wear.

In a third method step 22, communication with further wear-compensating readjustment apparatuses of the vehicle is performed via data interfaces, and the process is monitored and subjected to plausibility checks.

In the method for wear measurement as per FIG. 6, in a first method step 23, an initial position $x_{initial}$ of the brake pad 3, 3a is defined and stored in the control unit.

In a second method step 24, the measurement of the air gap is performed, as for example in the above-described method as per FIG. 5.

Here, the air gap measurement and setting is performed with a defined frequency in a method step 25, in a manner triggered by a number of braking processes, calculated braking energy, measured temperature (brake disk 2, brake pads 3, 3a and the like).

In a further method step 26, the friction-induced wear (pad wear and brake disk wear together) is calculated, on the basis of the method for air gap measurement with the overall rotational angle $\alpha_{overall}$, the gearing transmission ratio i, present air gap LS and spindle pitch p, as follows:

$$x_{wear} = x_{initial} - \alpha_{overall} * i * p + LS \quad (1)$$

A subsequent method step 27 serves for deciding whether a pad change is necessary. For this purpose, the wear value calculated in method step 26 is compared with a previously defined comparison value. As long as no pad change is necessary on the basis of this comparison, the method returns to method step 24.

If it is detected during the comparison in method step 27 that the comparison value has been reached, then the method moves to a subsequent method step 28, in which an item of information regarding the required pad change is generated and is for example displayed to the driver of the vehicle. This may be performed by a lamp, by a text display and/or the like.

After a pad change has been performed, the method recommences with the method step 23.

The disk brake may be actuated by compressed air, though may also have other types of drive.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE DESIGNATIONS

1 Disk brake
2 Brake disk
2a Brake disk axis
3, 3a Brake pad
4 Brake carrier
5 Brake caliper
5a Application section
5b Rear section
6, 6' Spindle unit
6a, 6'a Spindle axis
7, 7' Threaded plunger
7a, 7'a Thrust piece
8 Crossmember
8a Restoring spring
9 Brake rotary lever
10 Wear-compensating readjustment apparatus
11 Synchronizing unit
11a, 11'a Synchronizing wheel
11b Synchronizing means
12 Electric motor
12a Motor shaft
12b Drive and
12c Drive pinion
13 Gearing
13a Fastening section
13b Gearing section
13c Securing ring
14 Planet carrier
14a, 14'a Planet gear
14b Sun gear
15 Output element
15a Planet carrier
15b Coupling section
16 Clamping sleeve
17 Sleeve
18 Motor housing
18a Radial fixing
19 Cover
20 . . . 28 Method step
130, 131 Gearing stage
200 . . . 215 Sub-step

What is claimed is:

1. An electric wear-compensating readjustment apparatus for readjustment for compensation of friction surface wear on brake pads and brake disk of a motor vehicle disk brake having an application apparatus, the electric wear-compensating readjustment apparatus comprising:
   an electric motor;
   gearing;
   an output element; and
   a clamping sleeve having inwardly projecting longitudinal ribs on an inner side,
   wherein the output element is connected rotationally conjointly to the clamping sleeve.

2. The electric wear-compensating readjustment apparatus as claimed in claim 1, wherein a free end of the clamping sleeve has an engagement section configured for rotationally conjoint coupling of the clamping sleeve to a first synchronizing wheel of a synchronizing unit of the disk brake.

3. The electric wear-compensating readjustment apparatus as claimed in claim 1, wherein the electric motor is an electronically commutated electric motor.

4. The electric wear-compensating readjustment apparatus as claimed in claim 3, wherein the electric motor is controlled by a control unit configured to evaluate motor signals and to output at least one of a signal representing the present air gap and an air gap control signal.

5. The electric wear-compensating readjustment apparatus as claimed in claim 1, wherein a motor shaft and drive pinion of the electric motor and the output element are arranged coaxially.

6. The electric wear-compensating readjustment apparatus as claimed in claim 5, wherein the gearing is a two-stage planetary gearing or a three-stage planetary gearing.

7. The electric wear-compensating readjustment apparatus as claimed in claim 6, wherein a housing of the gearing has a fastening section configured to be positionally fixed in a brake caliper of the disk brake, and has a gearing section in which the two-stage or three-stage planetary gearing is arranged.

8. The electric wear-compensating readjustment apparatus as claimed in claim 7, wherein
the fastening section and the gearing section of the gearing housing are formed in one piece, and
the gearing section is formed with internal teeth as an internal gear of the two-stage planetary gearing or three-stage planetary gearing.

9. The electric wear-compensating readjustment apparatus as claimed in claim 8, wherein
a first gearing stage of the gearing is in engagement with the drive pinion of the electric motor as sun gear,
a second planet carrier of the second gearing stage of the gearing is a constituent part of the output element or a third planet carrier of the third gearing stage is a constituent part of the output element.

10. The electric wear-compensating readjustment apparatus as claimed in claim 1, wherein the electric motor has a high cogging torque.

11. An electric wear-compensating readjustment apparatus for readjustment for compensation of friction surface wear on brake pads and brake disk of a disk brake an application apparatus, the electric wear-compensating readjustment apparatus comprising:
an electric motor;
gearing configured to be rotated by the electrical motor;
an output element configured to be rotated by the gearing; and
a synchronizing wheel,
wherein the output element is arranged co-axially with a rotation axis of the electric motor, rotationally conjointly connected directly to the synchronizing wheel and arranged to be rotated by the gearing when the electric motor rotates.

12. The electric wear-compensating readjustment apparatus as claimed in claim 11, wherein the output element is formed in one piece with the synchronizing wheel.

13. A motor vehicle disk brake, comprising:
an application apparatus having a brake rotary lever and at least one spindle unit with a threaded plunger, and
at least one electric wear-compensating readjustment apparatus having
an electric motor;
gearing;
an output element; and
a clamping sleeve having inwardly projecting longitudinal ribs on an inner side,
wherein the output element is connected rotationally conjointly to the clamping sleeve.

14. The disk brake as claimed in claim 13, wherein
the wear-compensating readjustment apparatus is arranged above the threaded plunger at a side of the threaded plunger away from a brake pad end of the threaded plunger, and
a clamping sleeve is mounted onto and at least partially encloses the threaded plunger.

15. A method for measuring friction-induced wear of brake pads and of a brake disk of a disk brake as claimed in claim 13, comprising the acts of:
defining an initial position ($x_{initial}$) of the brake pad;
storing the initial position ($x_{initial}$) in the control unit;
measuring a present air gap;
calculating the friction-induced wear on the basis of the initial air gap, an overall wear adjustment rotational angle $\alpha_{overall}$, a gearing transmission ratio i, the present air gap LS and spindle pitch p in accordance with the following calculation rule:

$$x_{wear} = x_{initial} - \alpha_{overall} * i * p + LS$$

determining whether a brake pad change is necessary by comparing the calculated friction-induced wear with a predefined value; and
if a pad change is determined to be necessary, generating and at least one of displaying and communicating an item of information indicating a need to change the brake pads.

16. The method as claimed in claim 15, wherein
the act of measuring the present air gap includes the sub-acts of:
applying the brake pad by activation of the electric motor in a first direction of rotation until the brake pad makes contact with the brake disk at a contact point;
detecting said contact with the contact point by detecting at least one of an increase in current of the electric motor, a force sensor, a spacing sensor, and a temperature sensor configured to detect a change in temperature on at least one of a surface of the brake disk and of a surface of the brake pad;
stopping the rotational movement of the electric motor after detection of contact with the contact point;
calculating the air gap using a control unit using at least one of rotational steps, rotational angle, rotational angle position, axial position, and gearing transmission ratio;
activating the electric motor in a second direction of rotation opposite to the first direction of rotation to adjust the brake pad away from the brake disk into a position corresponding to the calculated air gap.

17. A motor vehicle disk brake, comprising:
an application apparatus having a brake rotary lever and two spindle units each having a threaded plunger,
at least one electric wear-compensating readjustment apparatus having
an electric motor;
gearing;
an output element;
a clamping sleeve having inwardly projecting longitudinal ribs on an inner side;
a synchronizing unit; and
a crossmember,
wherein
the output element at least partially encloses a first threaded plunger of a first one of the two spindle units, and
a coupling section of the output element is rotationally conjointly connected to a first synchronizing wheel of the synchronizing unit or is formed in one piece with the first synchronizing wheel.

18. A method for air gap measurement and air gap setting of a disk brake that includes an application apparatus having a brake rotary lever and at least one spindle unit with a threaded plunger, and at least one electric wear-compensating readjustment apparatus having an electric motor, gearing configured to be rotated by the electrical motor, an output element configured to be rotated by the gearing, and a clamping sleeve having inwardly projecting longitudinal ribs on an inner side, the output element being connected rotationally conjointly to the clamping sleeve and is arranged to be rotated by the gearing when the electric motor rotates, comprising the acts of:
- at least one of measuring a present air gap between a brake disk and brake pads of the disk brake and setting a new air gap; and
- communicating with further wear-compensating readjustment apparatuses of an associated vehicle via data interfaces, and
- monitoring and performing plausibility checks on the measured air gap and/or set air gap.

19. The method as claimed in claim 18, wherein
the act of at least one of measuring a present air gap and setting a new air gap includes the sub-acts of:
- applying the brake pad by activation of the electric motor in a first direction of rotation until the brake pad makes contact with the brake disk at a contact point;
- detecting said contact with the contact point by detecting at least one of an increase in current of the electric motor, a force sensor, a spacing sensor, and a temperature sensor configured to detect a change in temperature on at least one of a surface of the brake disk and of a surface of the brake pad;
- stopping the rotational movement of the electric motor after detection of contact with the contact point;
- calculating the air gap using a control unit using at least one of rotational steps, rotational angle, rotational angle position, axial position, and gearing transmission ratio;
- activating the electric motor in a second direction of rotation opposite to the first direction of rotation to adjust the brake pad away from the brake disk into a position corresponding to the calculated air gap;
- storing at least one of a deviation in air gap and the rotation performed in both clockwise and counter-clockwise directions relative to an air gap prior to adjustment; and
- calculating an overall rotational angle as a measure of wear.

20. A motor vehicle disk brake, comprising:
an application apparatus having a brake rotary lever and two spindle units each having a threaded plunger,
at least one electric wear-compensating readjustment apparatus having
an electric motor;
gearing;
an output element;
a clamping sleeve having inwardly projecting longitudinal ribs on an inner side;
a synchronizing unit; and
a crossmember,
wherein
the output element is connected rotationally conjointly to the clamping sleeve;
the crossmember is configured to support the two spindle units in threaded engagement on the crossmember and to cooperate with the brake rotary lever and a synchronizing device with synchronizing wheels arranged on the crossmember to provide wear-compensating readjustment,
the clamping sleeve is mounted onto a first threaded plunger of a first one of the two spindle units and at least partially encloses the first threaded plunger, and
a free end of the clamping sleeve is rotationally conjointly coupled to a first synchronizing wheel of the synchronizing unit.

21. The disk brake as claimed in claim 20, wherein the inwardly projecting ribs of the clamping sleeve engage longitudinal grooves of the first threaded plunger.

* * * * *